(12) United States Patent
Benser et al.

(10) Patent No.: US 10,404,925 B2
(45) Date of Patent: Sep. 3, 2019

(54) CHIP SCALE MULTISPECTRAL IMAGING AND RANGING

(71) Applicant: Honeywell International Inc., Morris Plains, NJ (US)

(72) Inventors: Earl Thomas Benser, Chisago City, MN (US); Grant Lodden, Minnetrista, MN (US); Xiao Zhu Fan, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 286 days.

(21) Appl. No.: 15/280,169

(22) Filed: Sep. 29, 2016

(65) Prior Publication Data
US 2018/0091746 A1    Mar. 29, 2018

(51) Int. Cl.
| | |
|---|---|
| *G01N 21/00* | (2006.01) |
| *H04N 5/33* | (2006.01) |
| *H04N 5/225* | (2006.01) |
| *H04N 9/083* | (2006.01) |
| *H04N 5/232* | (2006.01) |
| *H04N 9/04* | (2006.01) |

(52) U.S. Cl.
CPC .......... *H04N 5/332* (2013.01); *H04N 5/2253* (2013.01); *H04N 5/2256* (2013.01); *H04N 5/2258* (2013.01); *H04N 5/23245* (2013.01); *H04N 9/045* (2013.01); *H04N 9/083* (2013.01)

(58) Field of Classification Search
CPC .......... G01S 17/42; G01S 17/89; G01S 7/481; H04N 5/2253; H04N 5/2256; H04N 5/2258; H04N 5/23245; H04N 5/332; H04N 9/045; H04N 9/083

USPC ....................................... 356/237.5, 217.1–5
See application file for complete search history.

(56) References Cited

U.S. PATENT DOCUMENTS

| | | | | |
|---|---|---|---|---|
| 7,152,795 | B2 * | 12/2006 | Tsikos ................... | B82Y 15/00 235/462.01 |
| 9,215,386 | B2 | 12/2015 | Elkind et al. | |
| 2002/0060784 | A1 * | 5/2002 | Pack ...................... | G01S 7/481 356/6 |
| 2004/0119020 | A1 | 6/2004 | Bodkin | |
| 2010/0038520 | A1 * | 2/2010 | Yenisch ................ | G01S 7/4815 250/208.3 |

(Continued)

FOREIGN PATENT DOCUMENTS

WO    WO-2011015196 A1 *   2/2011 .......... G01S 7/4816

OTHER PUBLICATIONS

Nischan et al., "Active Spectral Imaging", Jan. 1, 2003, pp. 131-144, vol. 14, No. 1, Publisher: Lincoln Laboratory Journal.

*Primary Examiner* — Sunghee Y Gray
(74) *Attorney, Agent, or Firm* — Fogg & Powers LLC

(57) ABSTRACT

A system for multispectral imaging and ranging is provided. The system comprises at least one light illumination source, and a focal plane detector array configured to support both passive imaging and active imaging at multiple wavelengths. The focal plane detector array includes a plurality of pixels, wherein each of the pixels comprises a plurality of detectors. The detectors are configured to collect passive light to support passive imaging; collect retro-reflected light, transmitted by the at least one light illumination source, to support active illuminated imaging; and collect retro-reflected light, transmitted by the at least one light illumination source, to support active illuminated ranging.

20 Claims, 3 Drawing Sheets

(56) References Cited

U.S. PATENT DOCUMENTS

2012/0292482 A1* 11/2012 Cook ................... G01S 7/481
          250/206.1
2013/0044317 A1   2/2013 Justice et al.

* cited by examiner

CHIP SCALE MULTISPECTRAL IMAGING AND RANGING

BACKGROUND

Precision measurement of distances to objects or obstacles is needed to augment inertial measurements in order to provide accurate navigation solutions to autonomous vehicles. Imagery of a local scene can also be useful to enable "vision-aided" navigation for position determination and trajectory management of autonomous vehicles.

In some cases, environmental conditions may cause certain optical wavelength bands to experience high attenuation, so relying on a single optical band to provide sensor information may be problematic. Furthermore, environmental conditions encountered by an autonomous vehicle may preclude the use of a single imaging technology, such as visible band imaging at night.

SUMMARY

A system for multispectral imaging and ranging is disclosed. The system comprises at least one light illumination source, and a focal plane detector array configured to support both passive imaging and active imaging at multiple wavelengths. The focal plane detector array includes a plurality of pixels, wherein each of the pixels comprises a plurality of detectors. The detectors are configured to collect passive light to support passive imaging; collect retro-reflected light, transmitted by the at least one light illumination source, to support active illuminated imaging; and collect retro-reflected light, transmitted by the at least one light illumination source, to support active illuminated ranging.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
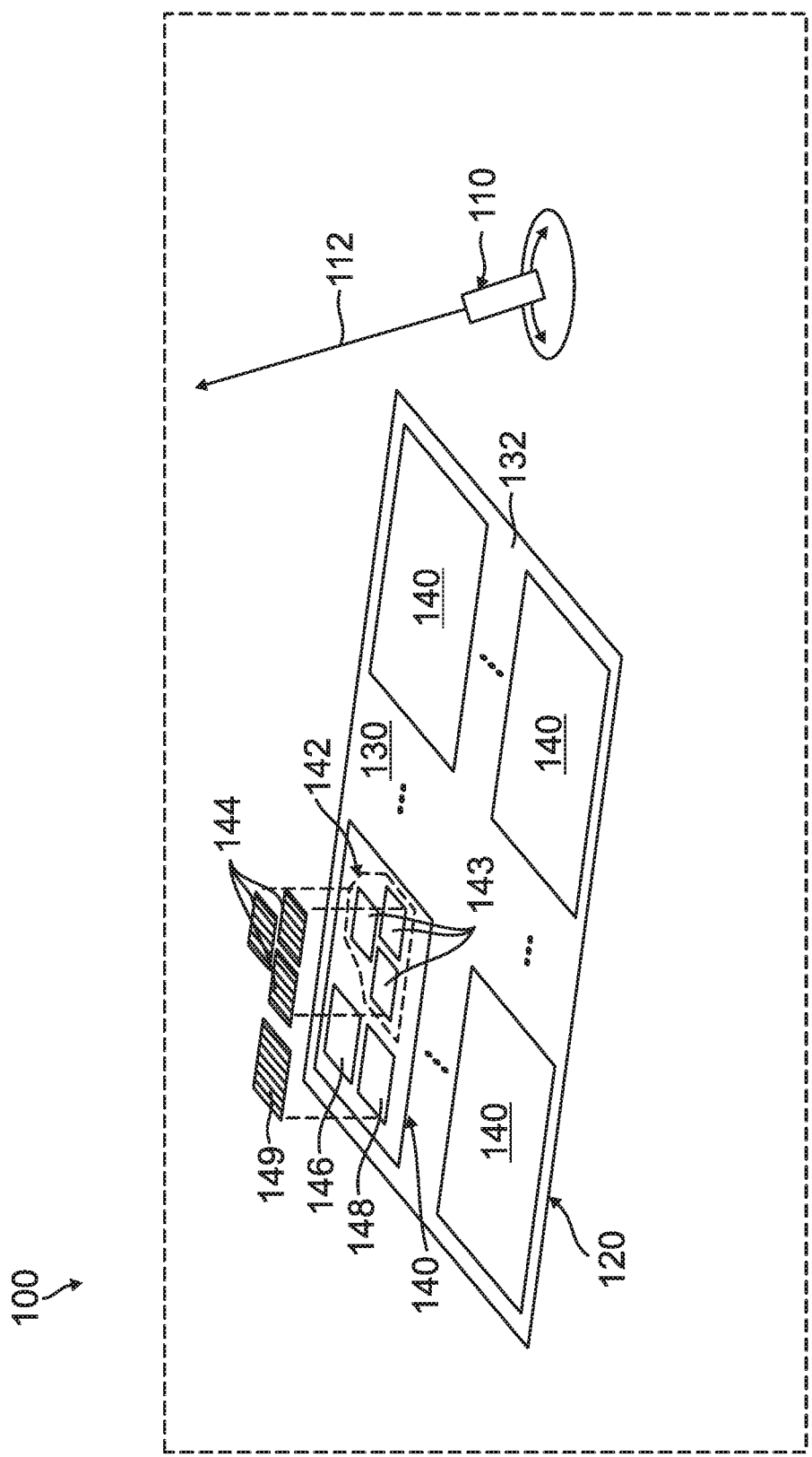
FIG. 1 is diagrammatic representation of a multispectral imaging system, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system for multispectral imaging and ranging is described herein in which sensor information can be provided by at least four channels of sensing. The system can be implemented as a chip scale, multi-sensor integrated device, which can scan and detect signals in the near and far infrared, visible, or ultraviolet spectrums. This allows the system to have various imaging capabilities. For example, the present system can provide for passive imaging, active illuminated imaging, or active illuminated ranging. The imaging and ranging platforms of the system can apply different optical spectrum of wavelengths in order to perform sensor interrogation.

While the chip scale, multi-sensor integrated device may have a limited field of regard (FOR), a plurality of these devices can be implemented in a sensor array on a vehicle to cover a full required FOR. For example, multiple devices can be attached to a vehicle to provide navigation data. This allows for multi-mode, multispectral sensing of an environment, such as the environment around an autonomous vehicle. The present device is particularly suited for use in autonomous vehicle navigation due to its small size and multimode detection functionality. In one implementation, a plurality of the devices is installed in a number of locations around an autonomous vehicle to allow for a nearly 360 degree assay of a local environment.

The multi-sensor integrated device generally includes at least one light transmitter such as one or more illumination sources, which can be optically coupled to various transmission optics such as one or more lenses, a telescope, or the like. The multi-sensor integrated device also includes a receiver array, which is optically coupled to receive optics and multiple detectors. The light transmitter is configured to provide illumination of either broad angular field of view for a broad area illumination pattern (for shorter range applications), or a steerable narrow beam for longer range applications.

A broad area illuminator may be realized using either a single pulsed light source, such as a vertical cavity surface emitting laser (VCSEL), semiconductor optical amplifier, or an array of laser sources together with a relatively simple optical telescope. More elaborate methods of beam steering/forming can be used to provide a tight narrow beam illumination. Such methods include the use of moving microlenses, moving optical stages, optical phased array emitters, or a rotary stage. The illuminator can be either on-chip with the receiver array, or can be off-chip with respect to the receiver array.

The receive optics are configured to collect and focus the input photons onto a focal plane of the detectors. As the receiver array can operate over a broad wavelength range (e.g., about 400 nm to about 100 micron) appropriate selection of the optical design and materials for the receive optics is needed. For example, far infrared optical elements can be fabricated with materials (e.g., ZnSe) that have some transparency in the visible band to allow all wavelengths to be collected. A reflective optical design may also be used to allow for broadband operation.

The detectors are implemented as part of a multi-function integrated focal plane detector array that supports both active and passive imaging at multiple optical wavelengths. The focal plane includes an array of pixels, where each pixel is comprises: a detector array to support passive imaging in the visible band, such as an RGB (red, green, blue) detector array; a detector to support active ranging and active imaging modes; and a passive infrared detector for passive long wave infrared (LWIR) imaging. In one embodiment, the infrared detector can be implemented as an uncooled microbolometer, which does not require low temperature cooling to operate. In one embodiment, the array of pixels can be geographically placed adjacent to each other in a two-dimensional array.

Further details of the present system are described hereafter with reference to the drawings.

FIG. 1 illustrates a multispectral imaging system 100 according to one embodiment. The system 100 generally comprises a light illumination source 110, and a receiver array 120 that includes multiple detectors. In addition, while system 100 can include additional components, such as receive optics and data processors, such additional components are not described herein for the sake of simplicity.

The light illumination source 110 produces a light beam 112, and can be implemented as a constant wave (CW) illumination source, or as a pulsed illumination source. In exemplary embodiments, light illumination source 110 can be configured to produce a wide angle beam illumination, a scanning narrow beam illumination, or a steerable narrow beam illumination. Examples of light illumination source 110 include a laser, a light emitting diode (LED), a lamp, or combinations thereof. Other examples include a scanning light detection and ranging (LiDAR) source, or as a flash LiDAR source.

The receiver array 120 comprises a focal plane detector array 130 that is configured to support both passive imaging and active imaging at multiple optical wavelengths. The focal plane detector array 130 includes a substrate 132 on which a plurality of pixels 140 reside, with each of pixels 140 including multiple types of detectors. Although FIG. 1 shows further details of the detectors on only one of pixels 140, it should be understood that each of pixels 140 include the same detector structures.

As depicted, pixels 140 each comprise a first detector 142 configured to collect passive visible light to support passive visible spectrum imaging, and to collect retro-reflected light transmitted by light illumination source 110, to support active illuminated imaging in the near infrared spectrum. In one embodiment, first detector 142 comprises a red-green-blue (RGB) detector array (also known as a Bayer filter). In one implementation, first detector 142 can include a set of identical photosensors 143 with color RGB visible filters 144 placed thereover to provide separate red, green, and blue sensitivity.

Each of pixels 140 also comprises a second detector 146 configured to collect passive infrared light to support passive infrared spectrum imaging. In one embodiment, second detector 146 comprises a microbolometer sub-pixel.

The pixels 140 also comprise a third detector 148 configured to collect retro-reflected light transmitted by light illumination source 110, to support active illuminated imaging through LiDAR. In one embodiment, third detector 148 comprises a LiDAR detector with a LiDAR filter 149 placed thereover. For example, the LiDAR detector can include an avalanche photodiode, with a narrowband optical filter placed over the avalanche photodiode. The avalanche photodiode provides the high sensitivity needed to sense weaker return signals from illumination source 110 when reflecting off distant targets. The narrowband optical filter is configured to reject out of band optical signals while maximizing a signal-to-noise ratio.

Figure 2:
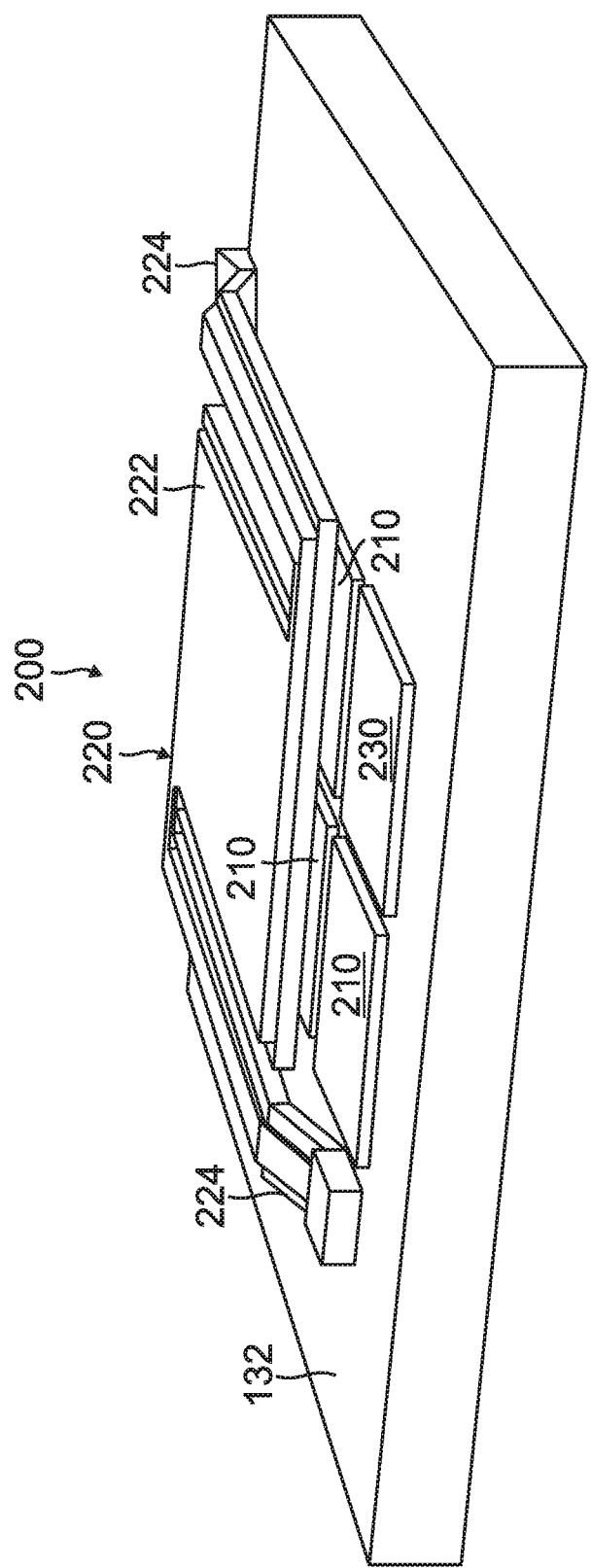
FIG. 2 is a perspective view of an exemplary pixel that can be implemented in a receiver array of a multispectral imaging system.

As illustrated in FIG. 1, detectors 142, 146, and 148 are arranged and located on each of pixels 140 in a two-dimensional array. In an alternative embodiment, the detectors can be located on each of the pixels in a three-dimensional array such that one of the detectors is suspended over the other detectors. Such an arrangement is illustrated in FIG. 2, which shows an exemplary pixel 200 that can be implemented as multiple pixels in a three-dimensional detector array for multispectral imaging system 100.

As depicted, pixel 200 comprises a visible light detector array 210 such as an RGB detector array, an infrared detector 220, and a LiDAR detector 230. The visible light detector array 210 and LiDAR detector 230 are located on a surface of substrate 132. The infrared detector 220 includes a microbolometer sub-pixel 222 that is formed on a support structure 224 composed of a material transmissive in the ultraviolet (UV), visible, and near infrared (IR) bands. The microbolometer sub-pixel 222 is suspended above and over visible light detector array 210 and LiDAR detector 230 by support structure 224. The microbolometer sub-pixel 222 is manufactured using materials that have at least some transmission in the visible light band, such as silicon nitride or vanadium oxide. This allows infrared detector 220 to be suspended above the other detectors to produce a three-dimensional detector array.

Figure 3:
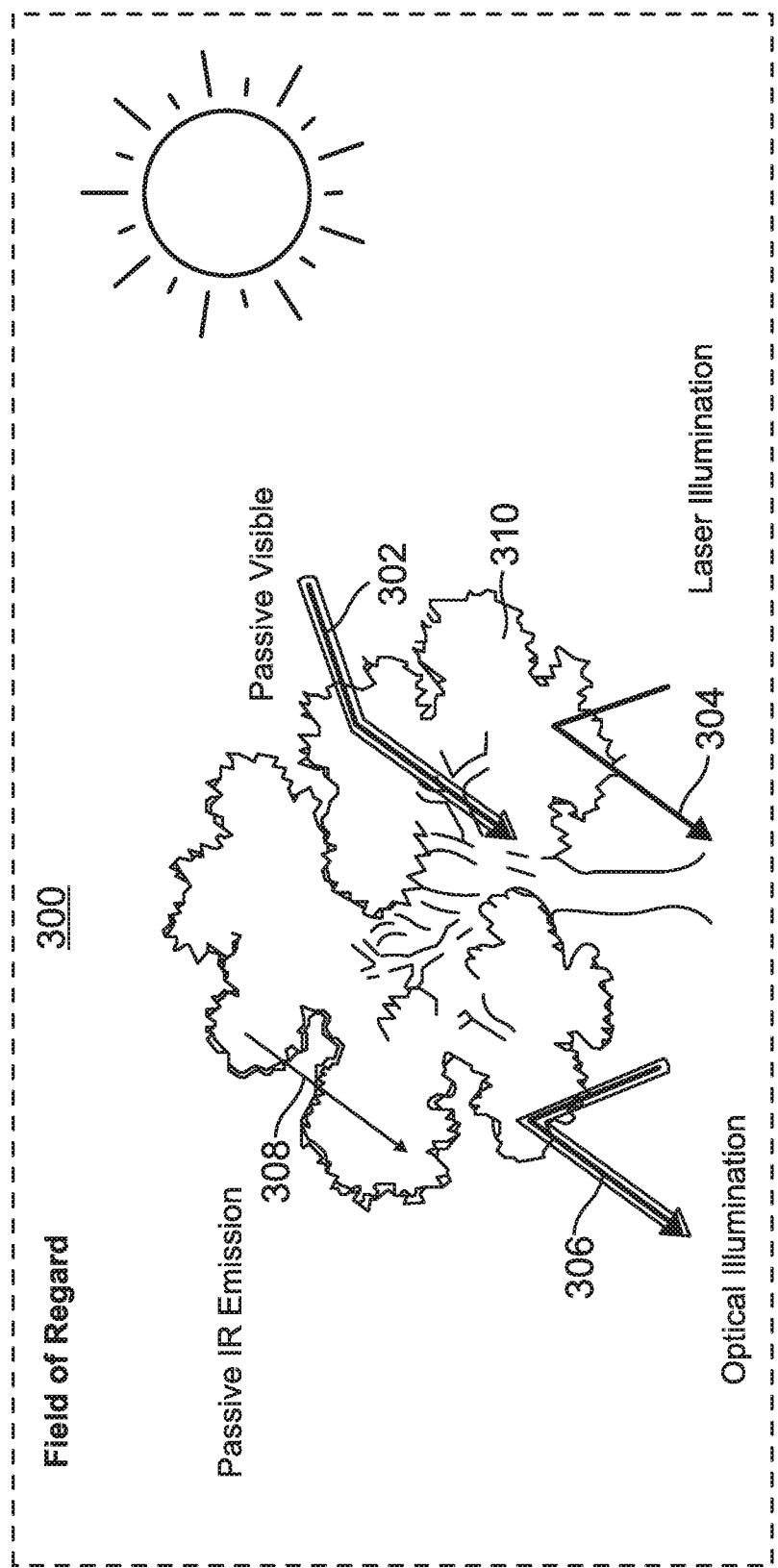
FIG. 3 is a field of regard diagram of an operation environment for a multispectral imaging system.

The multispectral imaging system 100 can be configured to have various operating modes. These operating modes are described with respect to FIG. 3, which shows a field of regard 300 of an operation environment for multispectral imaging system 100.

In a visible camera mode of multispectral imaging system 100, the RGB detector array can be operated as passive visible band imagers. For example, the RGB detector array would receive passive visible light 302, with no active illumination being used, in order to produce an image of an object 310 in the environment.

In a LiDAR mode, illumination source 110 can produce either a pulsed wide area narrow wavelength laser illumination, or a pulsed steerable narrow beam and narrow wavelength laser illumination. The LiDAR detectors collect a returning short pulse 304 from the laser illumination in the field of regard along a line of sight (LOS) of the pixels. The time of flight from emission of the illumination pulse to the collection of returning short pulse 304 is proportional to the range along the LOS to the reflective target in the field of regard. A narrow pulse width illuminating pulse can also be modulated/encoded with a short sequence of digital data to provide improved signal to noise, and reduction of crosstalk between sensor subsystems.

In an illuminated imaging mode, illumination source 110 can be operated in a non-pulsed, constant wave (CW) mode to continuously paint the scene with optical illumination 306. The RGB detector array collects returning photons from optical illumination 306 to develop an image of the scene. If illumination source 110 includes a pulsed VCSEL emitting in an infrared wavelength, and also the ability to emit visible band photons, such as by a white light LED, then imaging may be done by both the active imaging detector and the RGB detector array.

In an infrared camera mode, the infrared detectors collect passive infrared emissions 308 from the scene. For example, the microbolometer sub-pixels of the infrared detectors can collect incoming passive long wave infrared (LWIR) photons, and the output is used to create an infrared scene.

The operating modes of the multispectral imaging system may be selectable individually, or can be rapidly run in sequence automatically to provide a multi-mode perception of the area around the imaging system. Advanced processing methods may be used to fuse the data from the various operating modes together to support both navigation and situation awareness needs.

Example Embodiments

Example 1 includes a system for multispectral imaging and ranging, the system comprising: at least one light illumination source; and a focal plane detector array configured to support both passive imaging and active imaging at multiple wavelengths, the focal plane detector array including a plurality of pixels, wherein each of the pixels comprises a plurality of detectors configured to: collect passive light to support passive imaging; collect retro-reflected light, transmitted by the at least one light illumination source, to support active illuminated imaging; and collect retro-reflected light, transmitted by the at least one light illumination source, to support active illuminated ranging.

Example 2 includes the system of Example 1, wherein the at least one light illumination source comprises a constant wave illumination source, or a pulsed illumination source.

Example 3 includes the system of any of Examples 1-2, wherein the at least one light illumination source is configured to produce: a wide angle beam illumination; a scanning narrow beam illumination; or a steerable narrow beam illumination.

Example 4 includes the system of any of Examples 1-3, wherein the at least one light illumination source comprises at least one of a laser, a light emitting diode, or a lamp.

Example 5 includes the system of any of Examples 1-4, wherein the plurality of detectors in each of the pixels comprises: a first detector configured to collect passive light to support the passive imaging; a second detector configured to collect retro-reflected light to support the active illuminated imaging; and a third detector configured to collect retro-reflected light to support the active illuminated ranging.

Example 6 includes the system of Example 5, wherein the first detector comprises a red-green-blue (RGB) detector array.

Example 7 includes the system of Example 6, wherein the RGB detector array includes a set of identical photosensors with color optical filters placed thereover to provide separate red, green, and blue sensitivity.

Example 8 includes the system of Example 5, wherein the first detector comprises a microbolometer.

Example 9 includes the system of Example 5, wherein the first detector comprises an RGB detector array, and a microbolometer.

Example 10 includes the system of any of Examples 5-9, wherein the third detector comprises an active illuminated ranging detector with a narrowband optical filter placed thereover, the narrowband optical filter configured to reject out of band optical signals while maximizing a signal-to-noise ratio.

Example 11 includes the system of any of Examples 5-10, wherein the first detector, the second detector, and the third detector are located on each of the pixels in a two-dimensional array.

Example 12 includes the system of any of Examples 5-10, wherein the first detector, the second detector, and the third detector are located on each of the pixels in a three-dimensional array such that a microbolometer is suspended over the other detectors.

Example 13 includes the system of any of Examples 5-12, wherein the system is configured to operate in one or more modes comprising a visible camera mode, a ranging mode, an illuminated imaging mode, or an infrared camera mode.

Example 14 includes the system of Example 13, wherein during the visible camera mode, the first detector collects passive light without use of the at least one light illumination source to support the passive imaging.

Example 15 includes the system of any of Examples 13-14, wherein during the ranging mode, the third detector is configured to detect a returning illumination from a scene along a line of sight of each of the pixels.

Example 16 includes the system of any of Examples 13-15, wherein during the illuminated imaging mode, the at least one light illumination source is configured to operate in a non-pulsed, constant wave mode, with the at least one light illumination source continuously scanning a scene.

Example 17 includes the system of any of Examples 13-16, wherein during the infrared camera mode, a microbolometer in each of the pixels is configured to collect incoming long wave infrared imaging photons.

Example 18 includes the system of any of Examples 13-17, wherein each of the modes is selectable to operate individually, or to run automatically in sequence to provide a multi-mode perception of a surrounding area.

Example 19 includes the system of any of Examples 1-18, wherein the at least one light illumination source and the focal plane detector array are implemented in a chip scale integrated device.

Example 20 includes a detector array for a multispectral imaging and ranging system, the detector array comprising: a substrate having a surface; and a plurality of pixels on the surface of the substrate, the pixels configured to support both passive imaging and active imaging at multiple optical wavelengths, the pixels each comprising a plurality of detectors configured to: collect passive light to support passive imaging; collect retro-reflected light, transmitted by one or more light illumination sources, to support active illuminated imaging; and collect retro-reflected light, transmitted by the one or more light illumination sources, to support active illuminated ranging.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for multispectral imaging and ranging, the system comprising:
    at least one light illumination source; and
    a focal plane detector array configured to detect multiple wavelengths, the focal plane detector array including a plurality of pixels, wherein each of the pixels comprises a plurality of detectors operative to:
        collect passive visible light and passive infrared light; and
        collect retro-reflected light, transmitted by the at least one light illumination source to one or more objects;
    wherein the plurality of detectors in each of the pixels comprises:
        a first detector comprising a visible light detector array operative to collect the passive visible light
        a second detector comprising an infrared detector operative to collect the passive infrared light and
        a third detector comprising a light detection and ranging (LiDAR) detector operative to collect the retro-reflected light.

2. The system of claim 1, wherein the at least one light illumination source comprises a constant wave illumination source, or a pulsed illumination source.

3. The system of claim 1, wherein the at least one light illumination source is configured to produce:
    a wide angle beam illumination;
    a scanning narrow beam illumination; or
    a steerable narrow beam illumination.

4. The system of claim 1, wherein the at least one light illumination source comprises at least one of a laser, a light emitting diode, or a lamp.

5. The system of claim 1, wherein the first detector comprises a red-green-blue (RGB) detector array.

6. The system of claim 5, wherein the RGB detector array includes a set of identical photosensors with color optical filters placed thereover to provide separate red, green, and blue sensitivity.

7. The system of claim 1, wherein the second detector comprises a microbolometer.

8. The system of claim 1, wherein the third detector comprises an active illuminated ranging detector with a narrowband optical filter placed thereover, the narrowband optical filter configured to reject out of band optical signals while maximizing a signal-to-noise ratio.

9. The system of claim 1, wherein the first detector, the second detector, and the third detector are located on each of the pixels in a two-dimensional array.

10. The system of claim 1, wherein the first detector, the second detector, and the third detector are located on each of the pixels in a three-dimensional array such that a microbolometer is suspended over the other detectors.

11. The system of claim 1, wherein the system is configured to operate in one or more modes comprising a visible camera mode, a ranging mode, an illuminated imaging mode, or an infrared camera mode.

12. The system of claim 11, wherein during the visible camera mode, the first detector collects passive light without use of the at least one light illumination source.

13. The system of claim 11, wherein during the ranging mode, the third detector is configured to detect a returning illumination from a scene along a line of sight of each of the pixels.

14. The system of claim 11, wherein during the illuminated imaging mode, the at least one light illumination source is configured to operate in a non-pulsed, constant wave mode, with the at least one light illumination source continuously scanning a scene.

15. The system of claim 11, wherein during the infrared camera mode, a microbolometer in each of the pixels is configured to collect incoming long wave infrared imaging photons.

16. The system of claim 11, wherein each of the modes is selectable to operate individually, or to run automatically in sequence to provide a multi-mode perception of a surrounding area.

17. The system of claim 1, wherein the at least one light illumination source and the focal plane detector array are implemented in a chip scale integrated device.

18. A detector array for a multispectral imaging and ranging system, the detector array comprising:
  a substrate having a surface; and
  a plurality of pixels coupled to the surface of the substrate, the pixels configured to detect multiple optical wavelengths, the pixels each comprising a plurality of detectors operative to:
    collect passive visible light and passive infrared light; and
    collect retro-reflected light, transmitted by one or more light illumination sources to one or more objects; and
  wherein the plurality of detectors in each of the pixels comprises:
    a first detector comprising a visible light detector array operative to collect the passive visible light
    a second detector comprising an infrared detector operative to collect the passive infrared light and
    a third detector comprising a light detection and ranging (LiDAR) detector operative to collect the retro-reflected light.

19. The detector array of claim 18, wherein the first detector, the second detector, and the third detector are located on each of the pixels in a two-dimensional array.

20. The detector array of claim 18, wherein the first detector, the second detector, and the third detector are located on each of the pixels in a three-dimensional array such that the second detector is suspended over the first and second detectors.

* * * * *